Jan. 10, 1967 C. E. JACOBS ETAL 3,298,021
SYSTEM FOR THE MARKING OF RADAR ECHOES AND OTHER SIGNALS
OF OBSERVED OBJECTS ON A RADAR SCREEN
Filed Dec. 21, 1964 5 Sheets-Sheet 1

INVENTORS,
CHARLES E. JACOBS &
AAGE TEIEN.
BY
ATTORNEYS

Jan. 10, 1967   C. E. JACOBS ETAL   3,298,021
SYSTEM FOR THE MARKING OF RADAR ECHOES AND OTHER SIGNALS
OF OBSERVED OBJECTS ON A RADAR SCREEN
Filed Dec. 21, 1964                                 5 Sheets-Sheet 2

INVENTORS,
CHARLES E. JACOBS &
AAGE TEIEN.
BY Harry M. Saragovitz
Edward J. Kelly, Herbert Berl
& Julian C. Keppler
ATTORNEYS

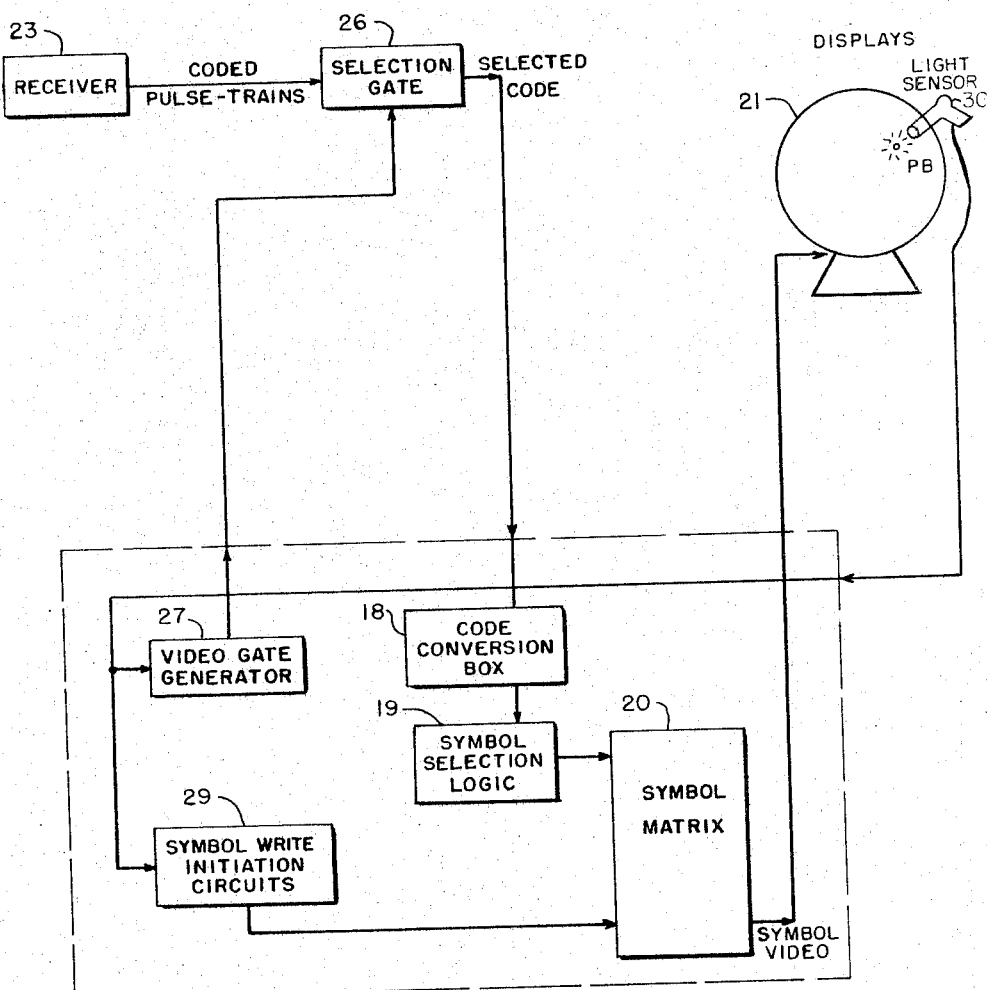

Jan. 10, 1967　　C. E. JACOBS ETAL　　3,298,021
SYSTEM FOR THE MARKING OF RADAR ECHOES AND OTHER SIGNALS
OF OBSERVED OBJECTS ON A RADAR SCREEN
Filed Dec. 21, 1964　　　　　　　　　　5 Sheets-Sheet 5
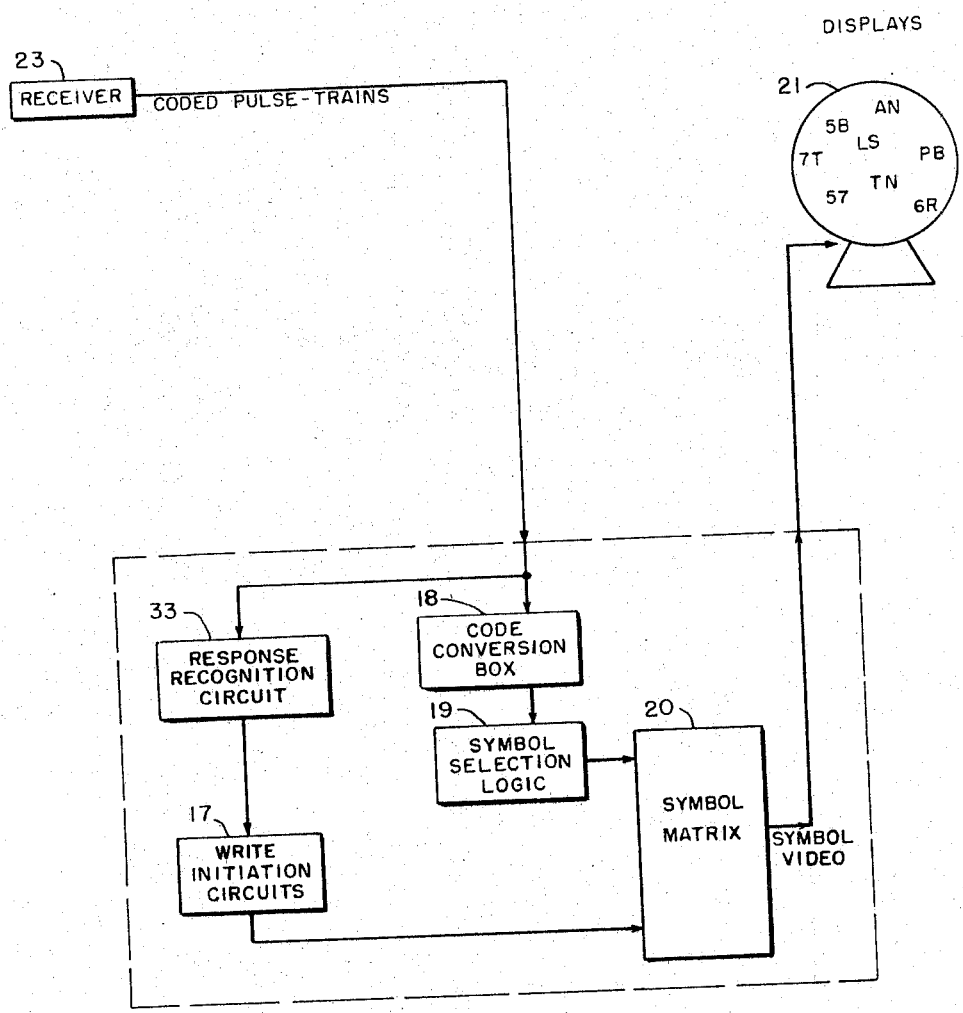
INVENTORS,
CHARLES E. JACOBS &
AAGE TEJEN.
ATTORNEYS

3,298,021
SYSTEM FOR THE MARKING OF RADAR ECHOES AND OTHER SIGNALS OF OBSERVED OBJECTS ON A RADAR SCREEN
Charles E. Jacobs, Silver Spring, Md., and Aage Teien, The Hague, Netherlands, assignors to the United States of America as represented by the Secretary of the Army
Filed Dec. 21, 1964, Ser. No. 420,232
Claims priority, application Netherlands, Dec. 24, 1963, 302,562
3 Claims. (Cl. 343—6)

The invention described herein may be manufactured and used by or for the Government for governmental purposes without the payment of any royalty thereon.

When observing targets by radar the tracks of the returns appearing on the radar displays must be brought to the knowledge of one or more control officers who have the task to take measures on the strength of incoming information concerning the targets observed.

In this document, the word "return" includes not only a reflected signal but also a signal emitted by a transmitter (transponder) in the target in response to an interrogation signal.

A conventional method provides for trackers assigned to different displays to pass on the positions of the targets observed over an internal telephone to a large plotting board, where the tracks of the targets are plotted on a map.

The plotted "air situation" then becomes the basis for action by responsible control officers.

It has been found that, especially when a large number of targets are being tracked, mistakes are easily made. This necessitates frequent inquiries and mistakes are apt to be made in the plotting. In addition, there is an inevitable delay in the transfer of information.

The present invention aims at a decreased probability of mistakes being made and a decrease in the delay of information transfer. Its object is to mark out the targets being tracked by symbols, each track being marked by a symbol allotted to it, directly on the CRT display.

A further object of the invention (in accordance with several variations of its embodiment) is to present, on a CRT, symbols corresponding to the signals received from a coded transponder in the target.

Since the symbols are generated from electrical impulses, these impulses (or symbol "video" signals) can be repeated on as many displays presentations as desired, thereby making possible presentations for control officers, symbolically marked by several trackers, without the necessity for reference to an intervening plotting board.

These symbols may for instance consist of letters, numerals or combinations of letters and numerals. Essential is that the markings must be easily recognizable.

The fundamental idea of the invention arises from the following considerations.

In the conventional plan-position indicators the sweep scans across the whole of the screen during each revolution of the antenna.

If, somewhere on the screen, an imaginary line is assumed having the shape of a letter, a numeral or any other easily recognizable mark, the sweep will pass through all elements of the said line during each revolution of the antenna.

If the sweep is intensified by a pulse each time the position of the sweep coincides with an element of this line, the screen will brighten up in this place and the character will be electronically written on the screen as a pattern of light.

If the pulses are passed on to the intensification circuits of all the associated cathode ray tubes, the mark will appear in the same place on all the associated screens, wheresoever they may be located. Since the use of this invention circumvents the reading of coordinates by the tracker on the one hand, and the understanding and plotting of the spoken coordinates by the plotter, on the other hand, the probability of mistakes being made in plotting the targets is considerably reduced. In addition the transfer of information from the tracker to the other CRT displays is practically instantaneous.

It is a condition that the marks must be near enough to the returns of the observed tracks, so that it can be seen which track is indicated by the marks. According to one embodiment of the invention a light-sensor is used for initiating the writing of the mark on a position indicator, the sensor being directed by the tracking operator concerned to the place where a return from the tracked target is expected and emitting an electrical signal introducing a writing operation at the appearance of the return.

The writing operation itself consists in that pulses intensifying the sweeps are arranged in a time scheme in such a way that the sweeps become visible in the configuration and at the location required by the symbol to be written.

According to the invention a matrix can be used for this purpose, for instance a transformer matrix having ferrite cores. Only the cores positioned at the cross points will emit pulses, when both the horizontal and the vertical line passing through the core are excited.

Further, sense wires having one end connected to an amplifier, have been laid through a number of cores arranged in the shape of a letter or a numeral. The output of said amplifier is connected to a video line leading to the intensification circuits of the associated displays.

The scanning of the matrix can take place as follows:

The horizontal lines of the matrix are excited in rapid succession during a sweep, whilst the vertical lines are successively kept in a state of excitation during the whole of a sweep.

Each cross point is then associated with a place on the screen which is determined by the time, in which the excitation of the matrix has started, and the places in which the sweep becomes visible are arranged corresponding to the positions of the cores through which the selected sense wire passes.

The cores may be of a normal ferromagnetic material that loses its magnetization spontaneously but cores that retain their magnetism, as in matrix memories are not excluded, though in this case the matrix after having been scanned must be reset.

The same results as with a transformer matrix can be obtained by connecting each line of the pair meeting at a cross point with one of the inputs of a two input AND-gate. In this way it is possible to associate an AND-gate with each cross point so that only at the output of the AND-gates associated with simultaneously excited lines a pulse will appear.

By connecting the outputs of selections of AND-gates conforming a number of cross points arranged in the shape of a symbol, to a common conductor, this common conductor is equivalent to one of the sense lines of the previous example.

Instead of the light-sensor other methods or means can be used to initiate a writing operation.

The main requirement is that a signal is generated in the right moment, that is, when the sweep is near enough to the place where the return appears, which starts the writing operation.

One of these methods is based on the following reasoning: each point of the display can be characterized in a unique way by two voltages e.g., one depending on the distance from the point where the individual sweeps start and the other on the time passed since the beginning of a scanning cycle.

These voltages are excited by the circuit feeding the electrodes of the CRT which control the movement of the electron beam.

On the other hand, it is well known that there are various means to excite two voltages by pointing to a specified place of a given surface and to give these voltages values equal to or proportional to the coordinates of said point. This can be done, for example, with an electrical pantograph or with the device known as "joy-stick."

By exciting a pulse at the moment the two sets of voltages are equal and a writing operation can be initiated in the same way as described above with the aid of the light-sensor.

It is also possible to put a coded signal which is incorporated in the returns in a register and use the recognition of that code as a means to initiate a writing operation.

It may be observed that the system described so far can also be used for identification of targets, for instance flying or otherwise moving objects equipped with a transponder.

Generally speaking, any device which is able to generate a pulse at the appropriate moment can be used to ensure that the symbol or the combination of symbols is written at the desired position on the display.

An illustration of an embodiment of the invention will now be given with reference to the accompanying drawing. In this embodiment a display is used wherein the position of the returns is given in polar coordinates. It will be clear that any other type of sweep organization can be used. In the chosen embodiment the writing operation is initiated by a signal generated by a light-sensor.

In a further embodiment of the invention the thus far described system is adapted for use in coded beacon systems, that is systems wherein at the request of the operator of the radar system transponders of the targets send their code for identifying purposes. This class of systems can be used for the following purposes:

The operator wants to know where the target is located that has a particular code. In the code set-up panel this particular code is set and the transponders of all targets transmit their codes, which are received. If any received code corresponds with the code in the set-up panel, a coincidence pulse is produced that initiates a writing operation as described.

A code converter is used to enable the selection of the symbols to be written near the place of the viewing screen where the radar returns or other signals of the target arrive.

In a further application of the invention the operator asks the code of the target in a location, defined by a given position.

In this application of the invention a gate is opened during the time the returns from the selected target can arrive. The received code is converted for the purpose of selecting a suitable group of symbols which are written near the displayed echo of the selected target. Positional selection may be accomplished by means of a light-sensor, pantograph, "joystick," or similar device, as previously indicated.

In still another application all targets are interrogated and their transponders transmit their code to a receiver of the radar system, and all received codes of a selected type or class are decoded and corresponding symbols displayed, each symbol or group of symbols proximate to the normal radar echo of the target transponding with the associated code.

Some characteristics which could not be made clear without referring to the drawing will be described, but it will be clear that several of these characteristics are not dependent on the use of a light-sensor.

Figure 3:
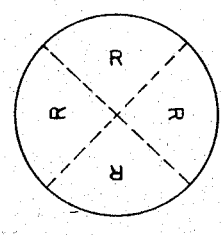

FIG. 3 gives the orientation of the letter R in the different quadrants.

Figure 4:
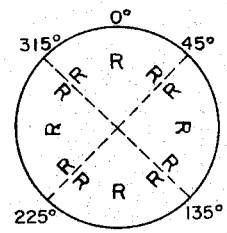

FIG. 4 gives a modified orientation enabling an easy recognition.

Figure 5:
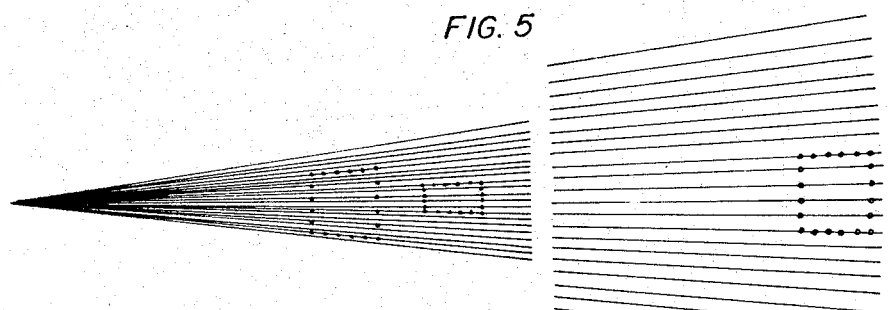

FIG. 5 indicates how the dimensions of the symbols are modified in tangential direction if they are written near the center.

Figure 6:
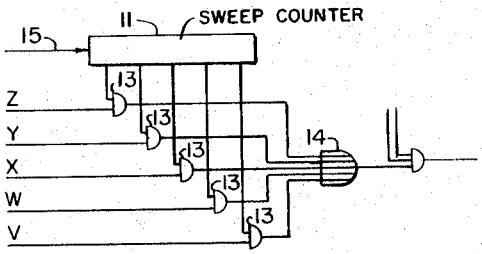

FIG. 6 shows a detail of the circuitry for skipping sweeps.

Figure 7:
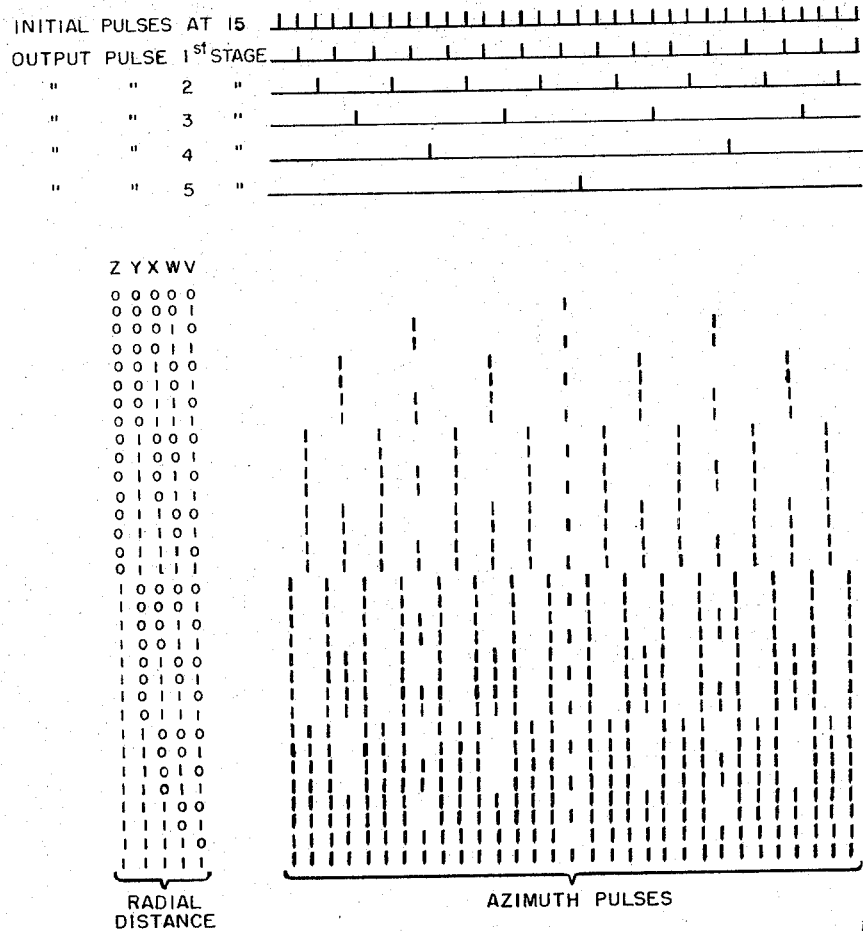

FIG. 7 shows how the number of skipped pulses varies with the radial distance of the returns.

Figure 8:
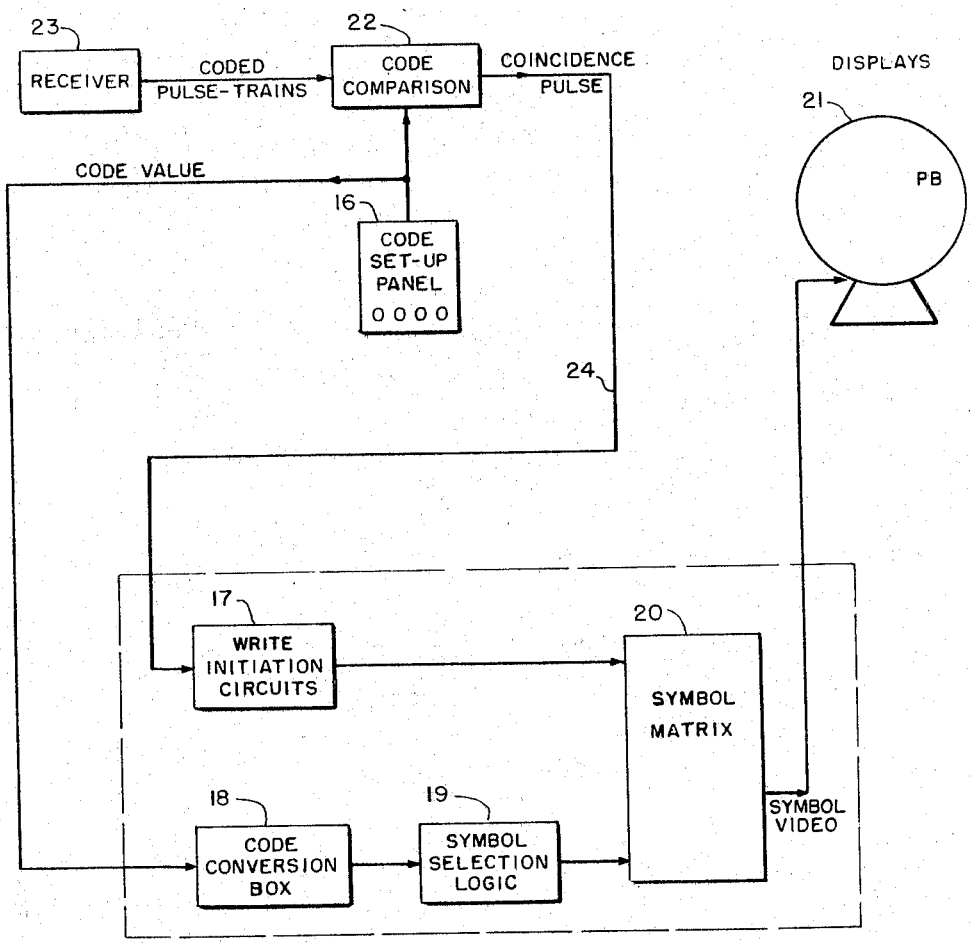

FIGS. 8–10 show how the equipment can be adapted for the purpose of identifying moving objects provided with a coded responder.

FIG. 8 relates to a passive decoder system, FIG. 9 to an active decoder system and FIG. 10 to a multiple target active decoder.

Figure 1:
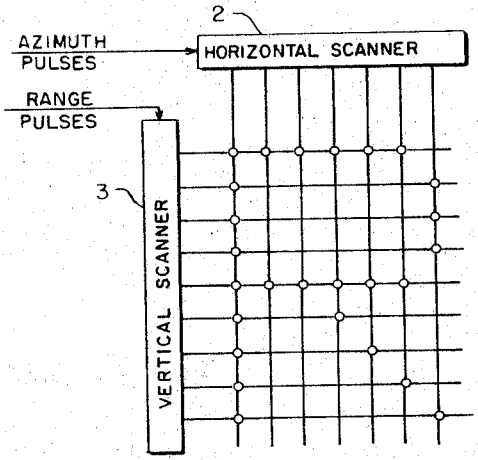
FIG. 1 is a matrix with a sense wire laid through a number of crossing points arranged in the shape of the letter R.
Figure 2:
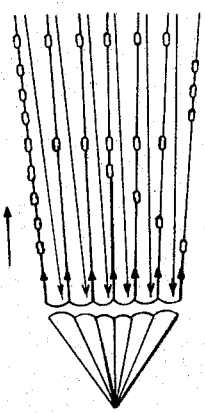
FIG. 2 shows the light spots on the P.P.I. corresponding to the elements of the letter R.

For the sake of example, the matrix 1 of FIG. 1 consists of 7 vertical lines and 9 horizontal lines.

In FIG. 1 the vertical lines are connected to a "horizontal" scanner 2 which, in case the symbol is to be presented in the upper quadrant, is driven by "azimuth" pulses, by which are meant pulses which are synchronous with the sweeps. These pulses are used to excite a vertical matrix line during a sweep.

The horizontal lines are connected to a vertical scanner 3 which is driven by pulses of a much higher frequency and excited one after the other so that in a fraction of the duration of a sweep all horizontal lines have been excited.

Both the aforesaid scanners can themselves for instance again be diode matrices having a number of lines, which are successively excited by the output pulses of binary counters serving as "clocks." The clock associated with the horizontal counter is driven by the azimuth pulses. And the clock associated with the vertical counter is driven by range pulses having a much higher repetition frequency. In principle the scanning of the matrix could start at the moment at which the light-sensor, which may be made in the shape of a gun, receives light from the return of the target tracked.

As soon as all elements of a vertical line of the matrix has been scanned through, the vertical counter has finished its work and it is not to start anew until the spot has regained the same radial distance which it had at the occurrence of the signal of the light-sensor.

This can be achieved in the following manner:

At the start of each sweep a clock is put into operation, which drives a range counter for the duration of said sweep. As soon as the light signal of the light-sensor occurs, the contents of the said counter are transferred to a static register which holds the counter contents, until the writing operation is finished.

As soon as, during the next sweep, the counter driven by the clock has the same contents as the static register, a coincidence pulse is excited. The coincidence pulse causes a flip-flop to be set, which then allows azimuth pulses, which are derived from the P.P.I. trigger, to pass to the matrix.

The horizontal counter receives the azimuth pulses and excites the vertical lines successively.

The range of the target being fixed by the contents of the static register, it may be desirable to start the writing earlier (i.e., at a smaller range), than the target pulse. This can be done by feeding the range counter during a suitably chosen time with pulses of a higher repetition frequency, thus causing the contents of the range counter to coincide with that of the static register earlier.

A method of doing this is to derive two pulses from the clock per period for instance by deriving a pulse from the trailing edge and from the leading edge of a squarewave clock pulse generator or by feeding pulses directly to the counter and via a delay circuit with a delay equal to half a period of the clock.

The time during which the double frequency count pulses are fed the counter can be set by a pulse having an adjustable duration and feeding this pulse together with the extra pulses to an AND-gate, the output of this AND gate being connected to the input of an OR-gate. Another input of this OR-gate receives the normal clock pulses. The repetition frequency of the range counter pulses will be doubled during the time the pulse with the adjustable duration exists.

The coincidence pulse recurs on successive sweeps, and puts the vertical counter into operation again, which excites the horizontal lines in rapid succession. Then the cores situated at the intersections of the horizontal lines and the vertical lines each produce a pulse and insofar as the selected sense wire passes through these cores on the crossings the latter becomes active and pulses are produced which modulate the sweep so that it becomes visible at the place where the sweep is at the moment the pulse is produced. Then the part of the selected symbol which was scanned during the first sweep, second, and so on, has been made visible on the screen near the return from the tracked target. After the whole of the matrix has been scanned, both counters can be reset to zero and the supply of the count pulses can be stopped.

If it is desired to write a symbol group consisting of two or more symbols near the return, the scanning of the matrix must be repeated once or several times, the sense wire for the following single symbol being each time selected. The selection of the successive symbols can be recorded in a memory or in a switch panel provided to the operator, from which the sense wire for the next symbol of the chosen group can be selected automatically.

In order to make sure that the writing operation is not initiated by an incidental bright up or noise on the screen at the place to which the light-sensor is pointed, use can be made of the fact that each target delivers a return on at least two successive sweeps.

By supplying the light signal and the coincidence pulse to an AND-gate it is possible to achieve that the writing operation is initiated only if the return on two successive sweeps occurs at the return associated with the target to be marked and is not the result of an incidental interference or noise peak.

If desired, a monostable flip-flop can be excited by the second light signal, the output signal of this flip-flop being applied to the video line input to the display and writing a radial line through the return. Then the writing operation of the selected symbol can start on the following sweep.

The aforesaid radial line serves to distinguish the return of the target to be marked from other returns lying in the same vicinity.

It may be observed that several light sensors, or other initiating devices can be used simultaneously in the same system. The system may comprise as many displays as desired and a number of operators provided with light sensors can be distributed over various displays operated by the same radar (Note: Several different receivers may be associated with a single radar).

When the above-described way of scanning the matrix is applied, the symbol appearing on the P.P.I. will have the orientation represented in the centers of the quadrants shown in FIGURE 3.

This may present some difficulties in reading the symbols. Writing the symbols in an upright position everywhere seems an all but impossible task, but a reasonable compromise can be arrived at by using a special method of scanning, which is possible without serious complications of the circuit.

When in the matrix of FIGURE 1 the symbol R has the orientation shown in FIGURE 3, the written symbol will have the orientation shown in the upper quadrant (315°–45°) if the horizontal lines of the matrix are scanned in the upward direction, the vertical lines from left to right and the sweep rotates as the hands of a clock.

In order to obtain the same orientation in the opposite quadrant, the horizontal as well as the vertical lines must be scanned in the reverse direction.

In the center of the second quadrant the symbol gets an upright position (FIG. 4) if the pulses occurring during a sweep scan the vertical lines from left to right and the horizontal lines in the rhythm of the successive sweeps from above downwards.

In the opposite quadrant, the scanning directions are exactly reverse.

The symbols have then been rotated at most over an angle of 45° with respect to the upright position.

The switching over of the two kinds of pulses which are to be supplied to the two counters, can be controlled by counting the azimuth pulses, starting therewith at a predetermined position of the antenna (for instance antenna north).

The two counters controlling the scanning of the matrix must be able to count both backwards and forwards and the moments for reversing the direction of the count and for shifting from horizontal lines to vertical lines and vice versa can also be derived from the contents of an azimuth pulse counter.

For obvious reasons it must be prevented that a symbol is rotated while a symbol is being written.

This means that when a writing operation is not terminated before the sweep appears in the next quadrant the transition of the scanning method in the quadrant wherein the writing operation is started must be delayed until the writing operation is completed.

If groups of more than one symbol are to be employed, the same control signals may be applied to the logic circuits which determine the order of selection of the sense lines which correspond to the individual symbols to be displayed in the group.

It is clear that, the nearer the target observed, the nearer to the center the returns will be. The dimensions of the symbols in the direction perpendicular to the radius decrease at the same rate as the radial distance, which impedes reading; see FIG. 5. According to a special feature of this invention this is avoided by scanning with pulses having lower repetition frequencies. To obtain appropriate lower frequencies one or more azimuth pulses are skipped. The skipping rate depends on the radial distance of the return from the center.

The information about this radial distance of the return is stored in the static register and from this register the skipping rate is derived.

The static register is preferably constituted by a series of elements each having one output that can assume two values, one representing a "Zero" the other a "One."

As the number of stages of the register must be large to enable a rather accurate determination of the distance of the target and the skipping rate need not be changed with every change of the contents of the static register, the required skipping rate can be derived from the most significant elements (stages) of the register.

The circuitry can be as follows:

Each of the outputs of the most significant elements of the static register is connected with an input of an AND gate.

The sweeps are counted in a binary counter, and when one of the stages changes from the zero, a one pulse is fed to the other input of one of the above-mentioned AND gates.

FIGURE 6 shows the circuitry for the skipping of the sweeps.

$z, y, x, w, v$ are the output conductors of the most significant stages of the static register.

The sweep counter 11 has shown in FIG. 6 five stages.

The outputs of each stage is connected to an input of one of the AND gates 13.

Each of the stages produces an output pulse when its content changes from 0 to 1. The most significant stage of the sweep counter has its output connected with the AND gate the second input whereof is connected with the least significant stage of the static register and so on.

The outputs of the several AND gates 13 are connected with the inputs of an OR gate 14 and if one or more of these inputs are high an impulse representing a sweep appears in the output of the OR gate.

In FIGURE 7 is shown the relation between the contents of the static register and the number of azimuth pulses available for the scanning of the matrix.

In the upper part of the figure the timing of the output impulses of the sweep counter is shown. The counter is driven by the radar trigger pulses applied at lead 15, appearing at the beginning of a sweep.

From inspection of FIGURE 7 it becomes apparent that when the contents of the static register 00001 only the pulse that is produced when the fifth stage of the sweep counter changes from 0 to 1 will appear in the output of the OR gate 14.

If the contents of the static register of 00101 a pulse will appear only when the third and the fifth stages of the sweep counter change from 0 to 1. In a complete counting cycle of the five stage binary counter 11 0,1,2 . . . or 31 pulses will appear, depending on the contents of the static register.

FIGURE 8 shows an arrangement for a passive decoder.

In this system all targets reply to the question, what is your code, and all targets transmit their code. The receiver 23 transmits the received code pulse trains to a code-comparator 22.

The received code is compared in code comparison circuit 22 with the contents of a code-set up panel 16 wherein a particular code is set. When the received code is identical with that in the panel a coincidence pulse is generated and fed to the write initiating circuits 17 via lead 24. The checked code is transmtted to the code conversion box 18 for converting the code for selecting the alpha-numeric symbols allotted to the code set in the code setup panel. This is accomplished by the symbol selection circuts 19. The symbols alotted to said code are written in the described manner with the help of the symbol matrix 20. In this manner the location of the plane or other moving object is marked (with symbology corresponding to the preset code) on the P.P.I. 21 or on a plurality of radar displays.

In FIGURE 9 the circuit is illustrated that is used to obtain an answer to the following question: what is the code of the moving object in a selected location.

Here the receiver 23 for the pulse trains is connected to a selection gate 26 that is open at the range of the object during the time that the sweeps strike this object, that is for instance during approximately 25 µsec. Gate 26 is opened at the required range by the video generator 27. The received code coming from the selection gate 26 is fed to the code converter 18 which has the same function as in FIGURE 8.

The video gate generator 27 and the write initiation circuit 29 are activated by the light sensor 30, or other means, pointed to the location where the return of the moving object arrives on P.P.I. display 21.

In FIGURE 10 the circuit is arranged for displaying all the codes of the objects that have a transponder whose signals can be received, provided the codes are within a selected type or class. All received codes are fed to a response recognition circuit 33· Its function is to ascertain that the received code is of the required type. The codes are again converted and if the recognition circuits 33 state that the code is of the required type it activates the write initiation circuits 17.

While the invention has been illustrated in connection with specific embodiments, many modifications thereof are possible without departing from the inventive concepts disclosed herein. Accordingly, the invention should be limited only by the scope of the appended claims.

What is claimed is:

1. A system for identifying radar targets on a radar display means comprising, a hand-held light sensor adapted to be placed in juxtaposition to a particular luminous target on said radar display means whereby said light sensor emits an electrical pulse output whenever said particular target is scanned, and means responsive to said pulse output of said light sensor to automatically produce one or more alpha-numeric characters on said radar display means adjacent to said particular target.

2. A system for identifying radar targets on a display means associated with a radar set comprising, a hand-held light sensor adapted to be placed in juxtaposition to a particular luminous target on said radar display means, and a receiver adapted to receive coded transponder signals from a plurality of targets within the range of said radar set, a selection gate connected to the output of said receiver, means to open said selection gate in response to an output from said light sensor, a symbol matrix containing a plurality of symbols each corresponding to a different one of said coded transponder signals, means connected between the output of said selection gate and said symbol matrix for selecting the symbol corresponding to the coded transponder signal in the output of said selection gate, and further means connected to said light sensor and said symbol matrix for initiating the writing of the symbol corresponding to said coded transponder signal on said display means.

3. A system for writing an identifying symbol on the display of a radar set adjacent a target indication thereon, comprising, a receiver adapted to receive coded transponder signals from a plurality of targets within the range of said radar set, a code comparison circuit connected to the output of said receiver, a code setup circuit which applies a signal corresponding to the transponder code of a desired target to said code comparison circuit, a symbol matrix containing a plurality of symbols each corresponding to a different one of said coded transponder signals, means connected between the output of said code setup circuit ad said symbol matrix for selecting the symbol corresponding to the code set up in said code setup circuit, and means connected between the said code comparison circuit and said symbol matrix to initiate the writing of said selected symbol on said display in response to an output from said code comparison circuit indicative of the reception of the code corresponding to that set up in said code setup circuit.

References Cited by the Examiner
UNITED STATES PATENTS

| | | | |
|---|---|---|---|
| 2,622,240 | 12/1952 | Fleming-Williams | 343—5 |
| 3,102,926 | 9/1963 | Fluhr et al. | 343—5 |
| 3,151,248 | 9/1964 | Glaser et al. | 343—5 |
| 3,158,857 | 11/1964 | Crosno et al. | 343—5 |
| 3,158,858 | 11/1964 | Ragen et al | 343—5 |
| 3,175,208 | 3/1965 | Simmons | 343—5 |
| 3,182,308 | 5/1965 | Dutton et al. | 343—5 |
| 3,217,320 | 11/1965 | Di Perry | 343—5 |

RODNEY D. BENNETT, *Acting Primary Examiner.*

CHESTER L. JUSTUS, *Examiner.*

P. M. HINDERSTEIN, D. C. KAUFMAN,
*Assistant Examiners.*